United States Patent [19]

Moody et al.

[11] Patent Number: 5,547,647
[45] Date of Patent: Aug. 20, 1996

[54] PRODUCTION OF ALUMINA

[75] Inventors: Gillian M. Moody, West Yorkshire; Clive Happs, Yorkshire, both of England

[73] Assignee: Allied Colloids Limited, West Yorkshire, England

[21] Appl. No.: 268,022

[22] Filed: Jun. 29, 1994

[30] Foreign Application Priority Data

Jun. 30, 1993 [GB] United Kingdom ............... 9313545
Jan. 14, 1994 [GB] United Kingdom ............... 9400690

[51] Int. Cl.$^6$ .................... C01F 7/00; C22B 21/00
[52] U.S. Cl. ............................. 423/121; 423/130
[58] Field of Search ...................... 423/130, 121

[56] References Cited

U.S. PATENT DOCUMENTS

| | | | |
|---|---|---|---|
| 3,917,529 | 11/1975 | Madole et al. .................... | 210/54 |
| 4,046,855 | 9/1977 | Schepers et al. ................. | 423/130 |
| 4,101,629 | 7/1978 | Mercier et al. ................... | 423/130 |
| 4,215,094 | 7/1980 | Inao et al. ........................ | 423/130 |
| 4,275,042 | 6/1981 | Lever ................................ | 423/130 |
| 4,275,043 | 6/1981 | Gnyra ............................... | 423/130 |
| 4,335,082 | 6/1982 | Matyasi et al. ................... | 423/130 |
| 4,519,989 | 5/1985 | Pearson et al. ................... | 423/121 |
| 4,578,255 | 3/1986 | Roe et al. ......................... | 423/130 |
| 4,650,653 | 3/1987 | Lepetit et al. .................... | 423/130 |
| 5,093,092 | 3/1992 | Misra et al. ...................... | 423/130 |

*Primary Examiner*—Steven Bos
*Attorney, Agent, or Firm*—Sughrue, Mion, Zinn, Macpeak & Seas

[57] ABSTRACT

Bauxite that is to be used in the Bayer process for the recovery of alumina is washed with aqueous wash liquor having a caustic content of at least 50 g/l and which comprises aqueous caustic from the alumina recovery circuit of the Bayer process and, after removing organic material from the wash liquor, the wash liquor is included in the digestion stage, the separation stage or the alumina recovery circuit of the Bayer process.

19 Claims, No Drawings

PRODUCTION OF ALUMINA

This invention relates to processes in which alumina is produced by digesting bauxite in aqueous caustic in a digestion stage to form a product comprising sodium aluminate and red mud, and then recovering alumina and separating the red mud from sodium aluminate liquor in a separating stage, and recovering alumina from the separated sodium aluminate in an alumina recovery circuit.

This process is generally known as the Bayer process and is operated as a cyclic process with a minimum of escape of used caustic from the cyclic process. Accordingly caustic liquor is recycled continuously in the process from the digestion stage to the separating stage and is returned, with fresh bauxite, into the digestion stage. Caustic liquor may be recycled in this manner for many years.

The bauxite tends to be contaminated with humic matter and some degradation of this to materials such as oxalic acid occurs in the digestion stage. The presence of oxalic acid, humic matter and other organic residues can interfere with the recovery of alumina in the separating stage, in particular it can interfere with the cystallisation of aluminium hydrate from the caustic liquor. It is therefore well known to include steps in the separation stage that are designed to remove humic matter and organic residues. Generally these removal stages are applied after the primary settler at which the red mud is separated from the recycling liquor containing sodium aluminate.

Various methods have been proposed for reducing the humate and other organic content of the caustic liquors including adsorption in U.S. Pat. No. 4,275,043, precipitation by fatty cationic compounds as described in U.S. Pat. No. 4,275,042 and various other ways of chemical removal as described in, for instance, U.S. Pat. Nos. 4,046,855, 4,101,629, 4,215,094, 4,335,082 and 4,280,987.

It has been known for many years that the separation of humates from aqueous liquids can be promoted by the addition of a coagulant or flocculant. For instance U.S. Pat. No. 3,917,529 is concerned with the problem that arises in the recovery of ilmenite when the silica separates from a tailings stream comprising water, colloidal humate and silica. This separation leaves a lake of colloidal humate which is very voluminous and very slow to settle. The solution proposed in U.S. Pat. No. 3,917,529 is to treat the tailings stream with a polymeric cationic amine so as to flocculate the humate with the result that it settles with the silica.

In U.S. Pat. No. 4,519,989, it is proposed to remove organic matter from a mineral ore by washing the ore with an aqueous solution containing caustic soda, sodium carbonate or mixtures thereof in an amount up to 80 g/l total alkali (expressed as sodium carbonate equivalent). When the ore is bauxite, it is stated that the amount of alkali should preferably be below 40 g/l, preferably about 20 g/l. After the washing, the washed bauxite is digested in caustic in the usual way and the used wash solution may be treated by wet oxidation and added lime to precipitate lime cake containing calcium carbonate, calcium aluminate and organic degradation products. After removal of the precipitate, the solution may be recycled for use as wash liquor for washing the ore. This process does not seem to have been successful, possibly because it was not very effective at removing the organic matter and/or because it resulted in some loss of aluminium from the ore into the lime cake.

Despite this proposal, current practice is that if the ore does have significant organic contamination, it is necessary to treat the separated sodium aluminate liquor in order to remove the organic contaminants prior to recovery of the alumina. For instance, in U.S. Pat. No. 4,578,255 a cationic polymeric quaternary ammonium compound is added to a Bayer process liquor containing dispersed solids (such as red mud particles, alumina trihydrate, oxalate salts or filter aids) with the result that humate is coated on to the solids and the coated solids can then be removed. Although this process can achieve some removal of humic matter, the process is conducted on the sodium aluminate liquor after the digestion stage with the result that much of the humic matter will by then have been converted into degradation products such as succinic acid salts, phthalic acid salts, sodium oxalate and possibly even to sodium carbonate. Since many of these degradation products are not removed by this process, it can sometimes be necessary to incorporate extra removal systems for removing, for instance, oxalate. If this is not done, the level of oxalates and other impurities may build up to unacceptable levels during the prolonged recycling of the aqueous caustic liquor.

The purpose of the invention is to provide a simple way of maintaining low organic contamination of the recycling caustic liquor.

A process according to the invention for producing alumina comprises removing organic material from bauxite by washing the bauxite with an aqueous alkali wash liquor in a washing stage, separating the washed bauxite from the wash liquor, separating organic material from the wash liquor, digesting the washed bauxite with aqueous caustic in a digestion stage to form a digestion product comprising sodium aluminate and red mud, separating sodium aluminate liquor from the red mud in a separating stage, recovering alumina from the sodium aluminate liquor in an alumina recovery circuit and recycling caustic from the alumina recovery circuit to the digestion stage, and in this process the wash liquor has a caustic content of at least 50 g/l (measured as sodium hydroxide) and comprises aqueous caustic from the alumina recovery circuit and, after recovering organic material from the wash liquor, the wash liquor is included in the digestion stage, the separating stage or the alumina recovery circuit.

It is naturally desirable that the washing should remove as large a proportion as possible of the organic material from the bauxite that is to be fed to the digestion stage. However the invention can sometimes be useful even when the amount of removal of organic matter at this stage is relatively low since even this can be a useful improvement. Generally therefore the amount of organic material removed by this washing stage can be as low as, for instance, 10% of the total amount of organic material that would otherwise be fed to the digester but is preferably at least 25% and most preferably at least 50%.

In order to achieve reasonable removal it is generally necessary to grind the bauxite and generally the degree of removal increases as the grinding becomes finer. If 50 to near 100% removal is desired, it is usually preferred to grind the bauxite to a particle size in the range 0.15 to 0.5 mm, but for many purposes it may be adequate to grind the bauxite merely to a particle size of not more than 0.85 or 1 mm. In practice, good results can usually be achieved if the bauxite is subjected to the same degree of grinding as is conventional when the bauxite is to be fed direct to the digester as in conventional processes.

Although washing can be achieved merely by flowing wash liquor through a bed of the ground particles, it is generally best to slurry the wash liquor with the ground particles for instance by including the wash liquor and the particles in a tank in which they are agitated together for a prolonged period. The duration of the slurrying typically is in the range 15 minutes to 24 hours. The slurrying can be conducted batchwise or continuously.

The wash liquor containing the organic material is then separated from the washed bauxite, generally by sedimentation and decantation, optionally with use of a flocculant.

It is necessary to remove organic material from the wash liquor before the wash liquor is cycled into the process liquors, as otherwise it will merely carry the organic material back into the process liquors.

This removal of organic material can be conducted by methods analogous to those already known for the removal of humic matter and other organic material from liquors.

In one process, the organic material can be removed by adsorption on to an adsorbent with which the wash liquor is contacted. Contact may be by, for instance, flow of the liquor through a column of adsorbent or by adding the adsorbent to the wash liquor, slurrying it with the wash liquor and then removing the adsorbent containing the organic material from the wash liquor, e.g., by filtration or sedimentation. Preferably the adsorbent is slurried with the wash liquor for a period of from 10 to 120 minutes. The adsorbent may be reused provided it still has capacity for adsorbing organic material.

The amount of adsorbent that should be contacted with the liquor for optimum results will depend on the nature of the adsorbent. It may be as low as 0.1% by weight based on the weight of wash liquor or may be as high as, perhaps, 30% or even 50%.

For instance slurrying with fine bone char having a particle size of 90% below 0.25 mm may give substantially complete adsorption in a reasonable time (for instance less than 60 minutes and preferably less than 30 minutes) at concentrations of 0.1 to 5% while similar material having an average particle size in the range 0.25 to 1 mm may need to be used either for a longer time or at a higher concentration, e.g., up to 10% or even 20%.

Fly ash having a particle size 99% below 180 μm can give high removal of the organic material in a short time (less than one hour and often less than 30 minutes) at amounts below 10%, for instance 0.5 to 5%.

Coke breeze typically having an average particle size in up to 0.5 mm can also give satisfactory separation in a reasonable period, for instance less than one hour) but generally necessitates higher amounts typically 3 to 30%.

Granular Beringite having an average particle size up to 2 mm can give useful reduction of humic matter but tends to require prolonged periods (30 minutes to twelve hours) at concentrations of 5 to 50%.

When the adsorbent is in the form of a column, the adsorbent needs to be suffiently granular to allow suitable flow and so normally is in the form of granules of at least 0.25 mm, and often up to 2 mm or more. Flow may be upflow or downflow. The number of bed volumes that can be passed whilst maintaining significant removal will depend on the conditions but is typically 100 to 1000 bed volumes. The lower the flow rate the greater the amount of humate that is removed. For example in one test at a flow rate of 0.762 $cm^3$/min 70–80% humate removal can be achieved at up to 400 bed volumes throughput whilst at 4.9 $cm^3$/min 30–60% humate removal is achieved.

Once the adsorptive capacity of the adsorbent has been reduced unacceptably, the adsorbent must then be either dumped or regenerated by various methods depending on absorbent type but may involve heat treatment, calcination or elution.

Another way of removing the organic material is by precipitating and/or flocculating the material by adding an appropriate precipitant and/or flocculant to the wash liquor and then removing the precipitated or flocculated material from the wash liquor. These methods require much lower dosages than are required when using adsorbent, but may not easily achieve such a low level of residual humate as are obtainable with some adsorbents.

Precipitation can be by chemical reaction as described in the prior art discussed in U.S. Pat. No. 4,578,255 but is preferably by adding a fatty amine, for instance as described in U.S. Pat. No. 4,275,042.

Flocculation can be by the addition of any polymeric flocculant that is suitable for flocculating the humic matter from the wash liquor. The flocculant may be a high molecular weight bridging flocculant or a lower molecular weight flocculant that might alternatively be described as a coagulant rather than as a bridging flocculant. Suitable flocculants are polyamines and poly DADMAC (polydiallyldimethyl ammonium chloride), for instance as described in U.S. Pat. No. 4,578,255. However whereas the process of U.S. Pat. No. 4,578,255 requires as an essential feature that the humic matter should be coated on to dispersed solids in order to achieve the required separation, in the present invention solids are preferably first separated from the wash liquor by sedimentation and the flocculant merely coagulates and flocculates the humic material substantially in the absence of dispersed solids.

In order to maximise the removal of organic material and to minimise unnecessary dilution of the caustic liquors in the digestion or separating stages or in the alumina recovery circuit, the wash liquor must have a caustic concentration of at least 50 g/l and preferably the concentration is at least 100 g/l. Although the wash liquor can have a temperature as low as, for instance 25° C. it is preferably higher than this both so as to maximise the dissolution of organic material and so as to minimise unnecessary cooling of the digestion or separation stages or recovery circuit liquor to which the wash liquor is added after removal of the organic material. Thus preferably the wash liquor is at a temperature above 40° C., often above 60° C. and preferably above about 80° C. Although the use of relatively hot and caustic wash liquor can promote release of humate from the bauxite, it can result in degradation of the humate and this can make subsequent removal of organic material from the wash liquor more difficult. In order to minimise unwanted degradation of humate it may be desirable to control the time for which the humate is exposed to the hot wash liquor prior to removal of the humate or other organic material from the liquor. Thus it may be appropriate to strike a balance between optimising the release of humate and causing undesirable degradation of the humate.

Loss of alumina values from the bauxite is avoided by recycling the wash liquor, after removal of the organic material, back into the caustic liquors that are processed through the digestion stage, separation stage or the aluminium recovery circuit. Thus, for instance, the wash liquor, after removal of the organic material, may be fed to the separation stage, and in particular it may be fed to the inlet or the outlet of the primary settler, where the red mud is flocculated and separated from the sodium aluminate liquor. Instead of being fed direct to, for instance, the inlet of the primary settler, the wash liquor from which the organic material has been removed could be included in the separating stage by being added to liquor that is fed to the separating stage from the red mud washing stages. For instance it could be added to the first or second washing stages and thus carried back from the first stage into the primary settler. Alternatively, the liquor from which the organic material has been removed can be included in the alumina recovery circuit, generally prior to the filters that preceed the crystallisation stages, or after the crystallisation stages.

Preferably, however, the wash liquor is included in the aqueous caustic in the digestion stage.

The aqueous wash liquor includes standard return liquor, i.e., liquor that is returning from the alumina recovery circuit, at which alumina (as aluminium trihydrate) has been crystallised from sodium aluminate liquor. Fresh caustic soda is normally added between the crystallisation and digestion stages and the wash liquor may be the liquor that exists before, or more usually after, this addition of fresh caustic soda. The caustic concentration, measured as sodium hydroxide, is usually in the range 50 to 300 g/l, usually 100 to 250 g/l. If, as is preferred, the wash liquor is the liquor that has been replenished by caustic soda and which will be used in the digester then the concentration is generally at least 200 g/l, measured as sodium hydroxide. In this preferred process the caustic liquor will usually be at a temperature above 25° C., and may be at a temperature of up to 100° C. (during the washing of the bauxite).

With such wash liquors, the wash liquor is usually recycled in the process by being cycled into the digestion stage. Thus it can be included in the aqueous caustic in the digester either by being fed into a line or tank between the wash stage and the digester or by being fed direct into the digester.

The following examples demonstrate the utility of various parts of the process and of the entire process.

EXAMPLE 1

A slurry comprising 140 g ground bauxite (average particle size about 0.5 mm) in 400 cm$^3$ of 200 g/l NaOH was made up at 25° C. and mixed for approximately ¼hr using a Heidolph mixer with gate stirrer. The mixer was removed and the slurry left to settle overnight. The amount of humate removed from the bauxite by this washing step was found to be about 0.4 mg humate per gram bauxite. When the process was repeated using 10 g/l sodium hydroxide wash liquor at 25° C., the amount of humate that was removed was found to be about 0.3 mg per gram bauxite. The treatment was conducted as follows.

The supernatant was decanted and gravity filtered through glass microfibre filter paper. A sample was retained for analysis using a u/v spectrophotometer at 420 nm.

EXAMPLE 2

The efficiency of the extraction of humate was further investigated using a range of sodium hydroxide strengths and two different temperatures. The tests were conducted as in Example 1.

| Test No. | Caustic Strength (g/l NaOH) | Temperature (°C.) | Humate Released (mg/g Bauxite) |
| --- | --- | --- | --- |
| 1 | 10 | 25 | 0.20 |
| 2 | 50 | 25 | 0.25 |
| 3 | 100 | 25 | 0.30 |
| 4 | 150 | 25 | 0.34 |
| 5 | 200 | 25 | 0.35 |
| 6 | 200 | 80 | 0.75 |

As caustic strength and temperature increase so the amount of humate released increases.

EXAMPLE 3

Samples of liquor produced from Test No. 1 and Test No. 6 from Example 2 were then treated with humate remover (polyDADMAC or bone char size below 0.5 mm)

The treatment was conducted as follows.

The supernatant was decanted and gravity filtered through glass microfibre filter paper. A sample was retained for analysis using a u/v spectrophotometer at 420 nm.

50 cm$^3$ samples of supernatant were transferred to 100 cm$^3$ breakers and placed on a magnetic multistirrer. The appropriate amount of humate remover (poly DADMAC flocculant or bone char size below 0.5 mm adsorbent) was added and a stopwatch started. Samples were stirred for 5 minutes. A 20 cm$^3$ volume was syringed from each breaker, filtered and analysed along with the blank using a u/v spectrophotometer at 420 nm. The following results were obtained.

| Caustic Strength g/l (NaOH) | Product | Dose | Residual Humate (ppm) |
| --- | --- | --- | --- |
| 10 | Untreated | — | 126 |
|  | PolyDADMAC | 30 mg/l | 120 |
|  |  | 75 mg/l | 91 |
|  | Bone Char | 2% | 32 |
|  |  | 10% | 15 |
| 200 | Untreated | — | 206 |
|  | PolyDADMAC | 30 mg/l | 200 |
|  |  | 74 mg/l | 185 |
|  | Bone Char | 2% | 70 |
|  |  | 10% | 47 |

Both humate removers are capable of removing humate from these wash liquors, but bone char is the most effective, and is capable of removing at least the same proportion of sodium humate at the higher caustic level as at the lower caustic level. PolyDADMAC appears to be more effective at the lower caustic level than at the higher caustic level, removing proportionally more humate at the lower level.

These examples clearly demonstrate that effective removal of humate and other organic material is achieved by slurrying with bauxite especially at high temperatures and caustic concentrations and that it is then easily possible to remove the humate from the hot alkaline wash liquor. Because of its temperature and alkalinity, the liquor can then satisfactorily be recycled to, for instance, the digester without causing undesirable cooling or dilution of the digester liquor and, since the liquor is being recycled into the process, there will be substantially no loss of aluminium from the process.

We claim:

1. A process for producing alumina comprising removing organic material from bauxite by washing the bauxite with an aqueous alkaline wash liquor in a washing stage, separating the washed bauxite from the washing liquor, separating organic material from the separated wash liquor, digesting the washed bauxite with aqueous caustic in a digestion stage to form a digestion product comprising sodium aluminate and red mud, separating sodium aluminate liquor from the red mud in a separating stage, recovering alumina from the sodium aluminate liquor in an alumina recovery circuit, and recycling caustic from the alumina recovery circuit to the digestion stage, wherein the wash liquor has a caustic content of at least 100 g/l, measured as sodium hydroxide and comprises aqueous caustic from the alumina recovery circuit and, after removing organic material from the wash liquor, the wash liquor is added to the digestion stage, the separating stage or the alumina recovery circuit.

2. A process according to claim 1 in which the wash liquor has a caustic content of 200–300 g/l.

3. A process according to claim 1 in which the wash liquor is at a temperature, during the washing of the bauxite, of above 40° C.

4. A process according to claim 3 in which the temperature during the washing of the bauxite is from 60°–90° C.

5. A process according to claim i in which the organic material is removed from the wash liquor by precipitating or flocculating the organic material by adding precipitant or flocculant to the wash liquor and then removing the precipitated or flocculated material from the wash liquor.

6. A process according to claim 1 in which the organic material is removed from the wash liquor by adsorbing the organic material from the wash liquor by contact with an adsorbent.

7. A process according to claim 6 comprising slurrying the adsorbent with the wash liquor, and then removing the adsorbent containing the organic material from the wash liquor.

8. A process according to claim 6 in which the adsorbent comprises bone char or fly ash.

9. A process according to claim 1 in which, after removal of the organic material, the wash liquor is added to the aqueous caustic in the digestion stage.

10. A process for producing alumina comprising removing organic material from bauxite by washing the bauxite with an aqueous alkaline wash liquor in a washing stage, Separating the washed bauxite from the washing liquor, separating organic material from the separated wash liquor by precipitating or flocculating the organic material by adding precipitant or flocculent to the wash liquor and then removing the precipitated or flocculated material from the wash liquor or by adsorbing the organic material from the wash liquor by contact with an adsorbent, digesting the washed bauxite with aqueous caustic in a digestion stage to form a digestion product comprising sodium aluminate and red mud, separating sodium aluminate liquor from the red mud in a separating stage, recovering alumina from the sodium aluminate liquor in an alumina recovery circuit, and recycling caustic from the alumina recovery circuit to the digestion stage, wherein the wash liquor has a caustic content of at least 100 g/l, measured as sodium hydroxide and comprises aqueous caustic from the alumina recovery circuit and, after removing organic material from the wash liquor, the wash liquor is added to the digestion stage, the separating stage or the alumina recovery circuit, in which process the wash liquor is at a temperature, during the washing of the bauxite, of above 40° C.

11. A process according to claim 10 comprising slurrying the adsorbent with the wash liquor, and then removing the adsorbent containing the organic material from the wash liquor and in which the adsorbent comprises bone char or fly ash.

12. A process according to claim 10 in which, after removal of the organic material, the wash liquor is added to the aqueous caustic in the digestion stage.

13. A process for producing alumina comprising removing organic material from bauxite by washing the bauxite with an aqueous alkaline wash liquor in a washing stage, separating the washed bauxite from the washing liquor, separating organic material from the separated wash liquor, digesting the washed bauxite with aqueous caustic in a digestion stage to form a digestion product comprising sodium aluminate and red mud, separating sodium aluminate liquor from the red mud in a separating stage, recovering alumina from the sodium aluminate liquor in an alumina recovery circuit, and recycling caustic from the alumina recovery circuit to the digestion stage, wherein the wash liquor has a caustic content of at least 200–300 g/l, measured as sodium hydroxide and comprises aqueous caustic from the alumina recovery circuit and, after removing organic material from the wash liquor, the wash liquor is added to the digestion stage.

14. A process according to claim 13 in which the organic material is removed from the wash liquor by precipitating or flocculating the organic material by adding precipitant or flocculant to the wash liquor and then removing the precipitated or flocculated material from the wash liquor.

15. A process according to claim 13 in which the organic material is removed from the wash liquor by adsorbing the organic material from the wash liquor by contact with an adsorbent.

16. A process according to claim 15 comprising slurrying the adsorbent with the wash liquor, and then removing the adsorbent containing the organic material from the wash liquor and in which the adsorbent comprises bone char or fly ash.

17. A process according to claim 13 in which the temperature during the washing of the bauxite is from 60°–100° C.

18. A process for producing alumina comprising removing organic material from bauxite by washing the bauxite with an aqueous alkaline wash liquor in a washing stage, separating the washed bauxite from the washing liquor, separating organic material from the separated wash liquor by adsorbing the organic material from the wash liquor by contact with an adsorbent, digesting the washed bauxite with aqueous caustic in a digestion stage to form a digestion product comprising sodium aluminate and red mud, separating sodium aluminate liquor from the red mud in a separating stage, recovering alumina from the sodium aluminate liquor in an alumina recovery circuit, and recycling caustic from the alumina recovery circuit to the digestion stage, wherein the wash liquor has a caustic content of at least 200–300 g/l, measured as sodium hydroxide and comprises aqueous caustic from the alumina recovery circuit and, after removing organic material from the wash liquor, the wash liquor is added to the digestion stage.

19. A process according to claim 18 comprising slurrying the adsorbent with the wash liquor, and then removing the adsorbent containing the organic material from the wash liquor and in which the adsorbent comprises bone char or fly ash.

\* \* \* \* \*